United States Patent [19]
Althaus et al.

[11] Patent Number: 5,313,785
[45] Date of Patent: May 24, 1994

[54] DYNAMIC PRESSURE MACHINE

[75] Inventors: Rolf Althaus, Flawil; Yau-Pin Chyou, Dottikon; Erwin Zauner, Baden, all of Switzerland

[73] Assignee: Asea Brown Boveri Ltd., Baden, Switzerland

[21] Appl. No.: 38,274

[22] Filed: Mar. 29, 1993

[30] Foreign Application Priority Data

Mar. 31, 1992 [DE] Fed. Rep. of Germany ....... 4210543

[51] Int. Cl.$^5$ .............................................. F02C 3/02
[52] U.S. Cl. .................................. 60/39.45; 60/39.822
[58] Field of Search ................... 60/39.45 A, 39.822; 431/268; 417/64

[56] References Cited

U.S. PATENT DOCUMENTS

| | | | |
|---|---|---|---|
| 3,084,511 | 4/1963 | Klapproth | 60/39.45 A |
| 4,603,547 | 8/1986 | Pfefferle et al. | 60/39.822 |
| 4,744,213 | 5/1988 | El-Nashar | 60/39.45 A |

FOREIGN PATENT DOCUMENTS

| | | |
|---|---|---|
| 0179233B1 | 3/1989 | European Pat. Off. . |
| 0468083A1 | 1/1992 | European Pat. Off. . |
| 1054651 | 4/1959 | Fed. Rep. of Germany . |
| 1526856 | 1/1971 | Fed. Rep. of Germany . |
| 4113680A1 | 9/1992 | Fed. Rep. of Germany . |

*Primary Examiner*—Richard A. Bertsch
*Assistant Examiner*—Michael I. Kocharov
*Attorney, Agent, or Firm*—Burns, Doane, Swecker & Mathis

[57] ABSTRACT

A dynamic pressure machine with integrated combustion has a cellular wheel containing a number of cells, in which a continuously recurring ignition and combustion process takes place. Neither energy supply from the outside nor a control action should be required to maintain this continuously recurring process. Means are provided for the automatic ignition and combustion of the entering fresh air-fuel mixture, in particular: at least one hot gas pocket disposed on the wall of the cell; a catalytic coating of the cell wall; and, a hot spot in the cell.

4 Claims, 3 Drawing Sheets

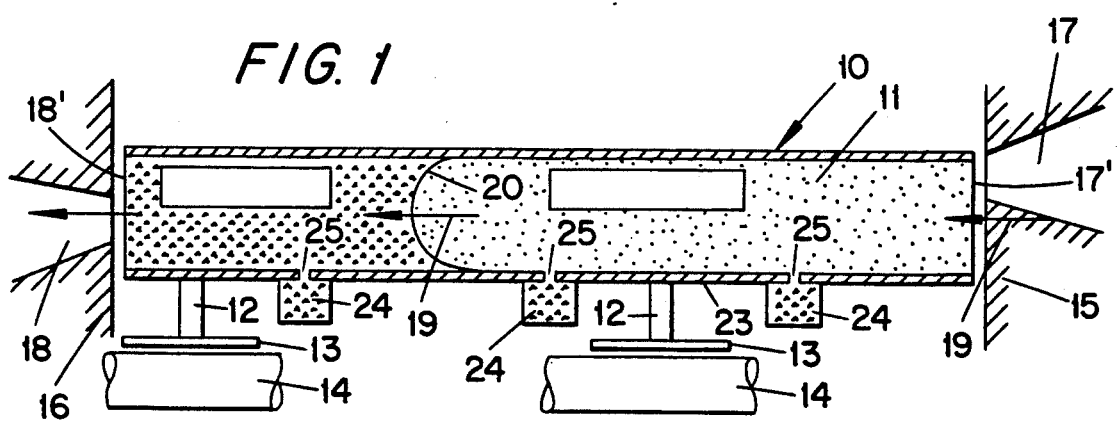
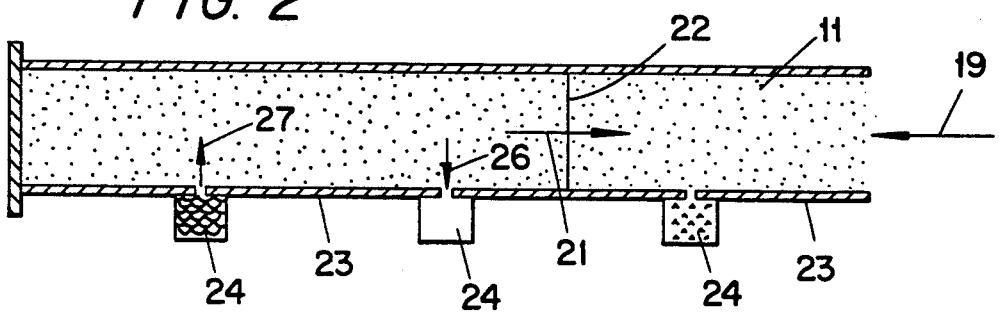
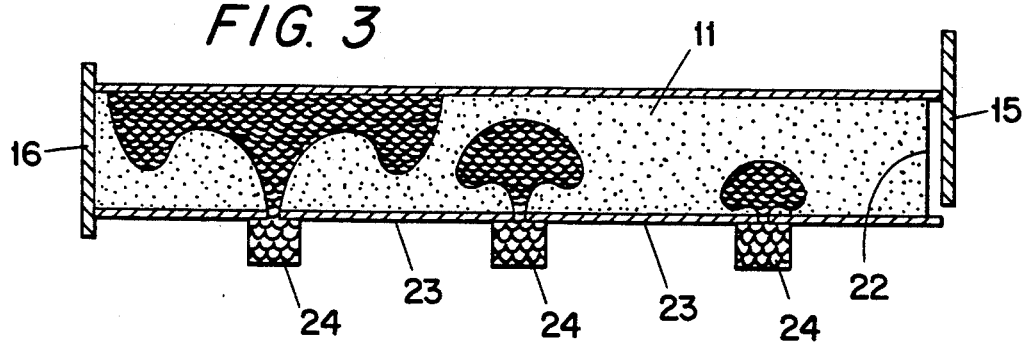
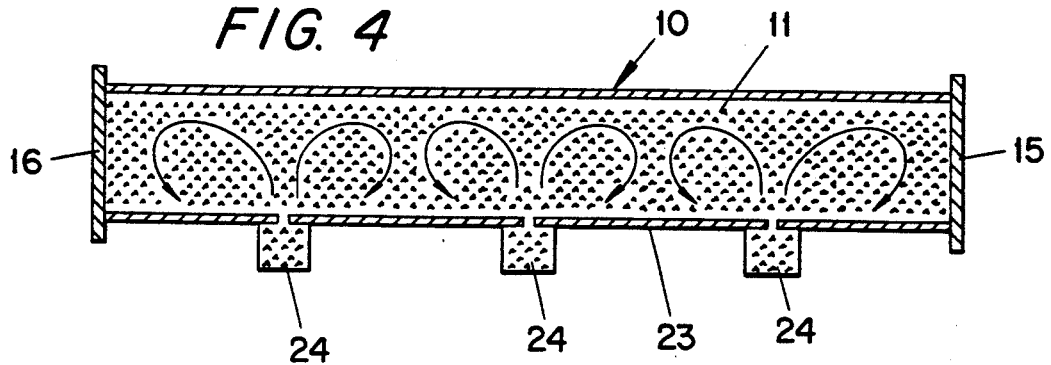

DYNAMIC PRESSURE MACHINE

FIELD OF THE INVENTION

The invention relates to a dynamic pressure machine with integrated combustion, having a cellular wheel rotating between lateral sections on the air side and the gas side and provided with inlet and outlet openings and having a number of cells in which a continuously recurring ignition and combustion process takes place.

BACKGROUND OF THE INVENTION

In a known device of this type, the continuously recurring ignition and combustion process is caused by controlled ignition means. The expense for these controlled ignition means is great.

OBJECT AND SUMMARY OF THE INVENTION

It is an object of the present invention to provide a dynamic pressure machine in which this expense is considerably less and where the machine is of simpler construction. In addition, the dynamic pressure machine is intended to be able to adapt itself to changed operating parameters, in particular changes in the rotational speed.

This object is attained in accordance with the invention in that means for automatic ignition and combustion of the entering fresh gas mixture are provided at least on one wall of the cell. These means can be formed by a. a hot spot in the cell, This object is attained in accordance with the invention in that means for automatic ignition and combustion of the entering fresh gas mixture are provided at least on one wall of the cell. These means can be formed by a. a hot spot in the cell,
b. a catalytic coating on the cell wall,
c. by a hot gas pocket formed on at least one wall of the cell, which is connected by means of an opening with the interior of the cell.

In a preferred embodiment of the present invention a plurality of hot gas pockets are disposed one behind the other along the flow direction of the cell. These hot gas pockets can be installed in the cell wall in an insulated manner. They can have an additional interior rib-like surface.

The described dynamic pressure machine has the following advantages:

a. The continuously recurring ignition and combustion process maintains itself automatically;
b. The ignition and combustion process can adapt to changed operating parameters, in particular the rotational speed, automatically. Neither control actions nor energy supply are required.
c. The machine does not require additional moving parts.

Presently preferred embodiments of the dynamic pressure machine of the invention are described in detail below by means of the attached drawings.

BRIEF DESCRIPTION OF THE DRAWINGS

The present invention can be further understood with reference to the following description in conjunction with the appended drawings, wherein like elements are provided with the same reference numerals. In the drawings:

FIGS. 1 to 4 are schematic views of a dynamic pressure machine at various times of the recurring (periodic) ignition and combustion process;

DETAILED DESCRIPTION OF THE PREFERRED EMBODIMENTS

Figure 5:
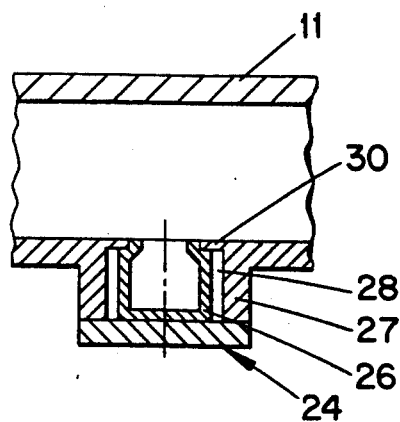
FIGS. 5 to 7 illustrate three different exemplary embodiments of the hot gas pockets schematically shown in FIGS. 1 to 4.

A dynamic pressure machine is considered to be known, so that the drawings only show as much as is required to understand the present invention. Only a single cell 11 of a cellular wheel 10 having a plurality of cells 11 is shown in FIG. 1. The cellular wheel 10 is formed by a ring- or cylinder-shaped collar of cells 11, which are rotatably seated on disk-shaped wheels 12 via a hub 13 on a shaft 14. The axis of the cylinder-shaped collar of cells 11 coincides with the axis of the shaft 14. The cellular wheel 10 is located between two first lateral parts 15 and 16. One of the lateral parts 16 has outlet conduits 18 and is therefore identified as the outlet lateral part or lateral part on the gas side. The other lateral part 15 has inlet conduits 17 and is identified as the inlet lateral part or lateral part of the air side. Only a single outlet conduit 18 and a single inlet conduit 17 of these outlet and inlet conduits are shown in the drawings.

The cells 11 are disposed on the wheel 10 to communicate with the inlet 17 and outlet 18 conduits when aligned with the conduits by rotation of the wheel, as shown in FIG. 1. Each cell 11 has an inlet opening 17' and outlet opening 18' corresponding to the inlet 17 and outlet 18 conduits. A fresh air-fuel mixture flows through the inlet conduit 17 into the cell 11 and pushes the exhaust gases into the outlet conduit 18. This operation is indicated by arrows 19. A separating line or boundary surface 20 is indicated between the air-fuel mixture and the exhaust gas. Because the cellular wheel 10 can rotate with respect to the two lateral parts 15 and 16, the inlet and outlet openings of the cell are closed by this rotary movement. In this way a pressure wave 22 is generated. As shown by an arrow 21 in FIG. 2 the pressure wave 22 moves in the opposite direction from the said flow direction, shown by arrow 19. The pressure wave is indicated by a flat surface 22.

In a preferred embodiment, a plurality of hot gas pockets 24 are disposed on a wall 23 of the cell 11 in the gas flow direction. Each pocket 24 is connected via an opening 25 with the interior of the cell 11. The function of these hot gas pockets 24 will be described in what follows.

The following four periods in the process ignition and combustion process are illustrated in FIGS. 1 to 4:

FIG. 1: the period of gas flow;
FIG. 2: the period of compression and mixing;
FIG. 3: the ignition period by means of the hot gas pockets 24;
FIG. 4: the combustion period in the cell 11.

During the period of flow shown in FIG. 1, the three hot gas pockets 24 remain filled with hot exhaust gases and the fresh air-fuel mixture does not enter the hot gas pocket. During the period of compression and mixing in FIG. 2, the hot gas present in the hot gas pockets 24 is first compressed and subsequently can expand, as indicated by the arrows 26 and 27, respectively.

In the ignition period, in FIG. 3, as soon as the compression wave 22 has reached the one end of the cell 11, hot exhaust gas flows from the hot gas pocket 24 into the air-fuel mixture present in the cell 11. The hot gas from the hot gas pocket 24 ignites the air-fuel mixture. Following the initial ignition, the entire air-fuel mixture is combusted to form exhaust gas while forming eddies in the flow, as indicated in FIG. 4.

Figure 6:
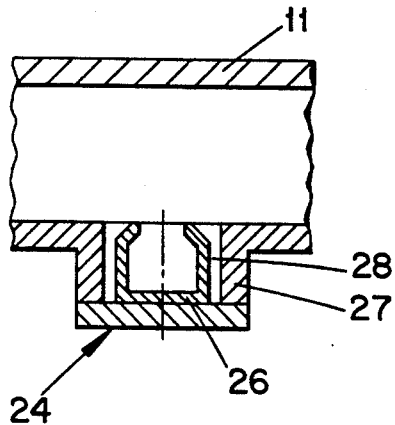
Figure 7:
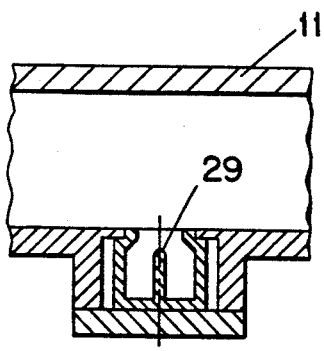

In FIG. 5, the hot gas pocket 24 has an inner housing 26 contained within an outer housing 27. An annular hollow chamber 28 or gap 28 is located between the housings 26 and 27 to provide insulation for the hot gas pocket 24. A flange 30 prevents hot gases from entering the hollow chamber or gap 28 between the inner and outer housing 26 and 27. In FIG. 6, the hollow chamber or gap 28 between the inner and outer housings 26 and 27 is open towards the interior of the cell 11, so that hot gases or a fuel-air mixture can enter the hollow chamber or gap 28. In FIG. 7 the hollow chamber 28 is closed, the same as in FIG. 5. However, a rib 29 is fastened in the interior of the inner housing 29 and hot gases can flow around it on all sides. Thus, the rib 29 only cools slowly. High temperatures arise in the hot gas pocket 24, for this reason it is preferable to use a suitable material or suitable substance, for example ceramics, in particular for the inner housing 26 of the hot gas pocket 24.

Figure 8:
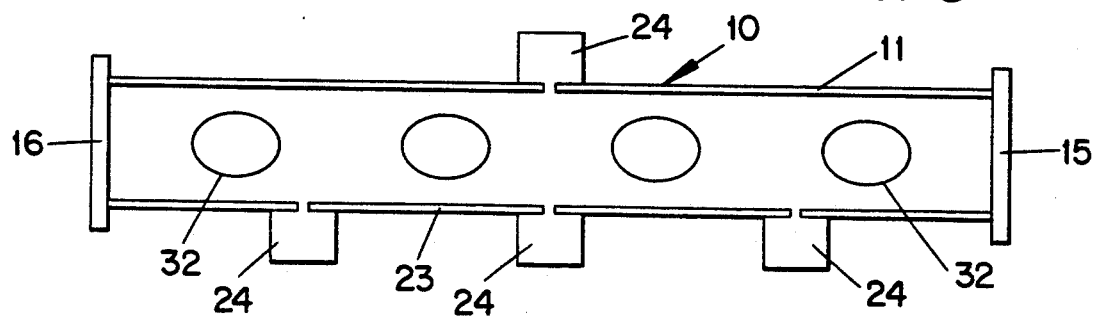
FIG. 8 is a schematic of a cell illustrating presently preferred locations for a catalytic coating for assisting ignition.

A catalytic coating 32 may be placed on individual sites in the cell 11 or in the hot gas pockets 24 to reduce the temperature necessary for the course of the combustion reaction or, while maintaining the same temperature, to increase the rate of reaction. The effect of the described ignition technique can be increased by such catalytic coating. Thus, the range of the permissible combustion conditions can be increased. In a preferred embodiment of the present invention, the catalytic coating 32 may be formed of platinum alloys or ceramic catalysts. Of the ceramic catalysts, the group of perovskites is preferred. Perovskites are related to high temperature superconducting materials. The catalytic coating 32 can be placed at any place, for example exclusively on parts of the hot gas pockets 24. In a presently preferred embodiment, catalytic coating 32 is applied to the cell wall 23, as shown in FIG. 8. Alternatively, the entire inner surface of the cell 11 may be coated with a catalytic coating.

Figure 9:
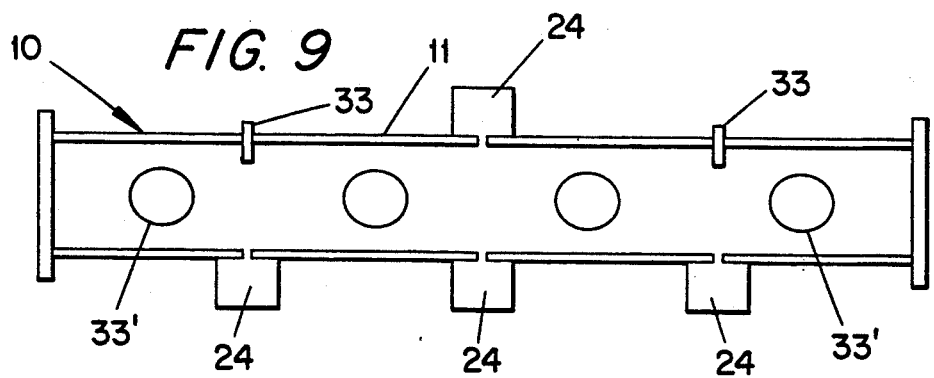
FIG. 9 is a schematic of a cell illustrating presently preferred locations for hot spots for initiating ignition.

Alternatively, at least one hot spot 33 may be located on the cell wall 23 for initiating ignition. In a presently preferred embodiment, the hot spot 33 comprises an electrically heated pin which extends into the cell 10 at selected locations along the flow direction. Alternatively, a hot spot 33' may comprise a location on the cell wall 23 which is heated by means external to the cell, for example, an electrical resistor. FIG. 9 illustrates various locations for the hot spots 33 and 33'. The hot gas pockets 24 may be considered a special form of the hot spots 33. The hot spots 33 may be used alone to initiate ignition or in combination with the hot gas pockets 24.

Figure 10:
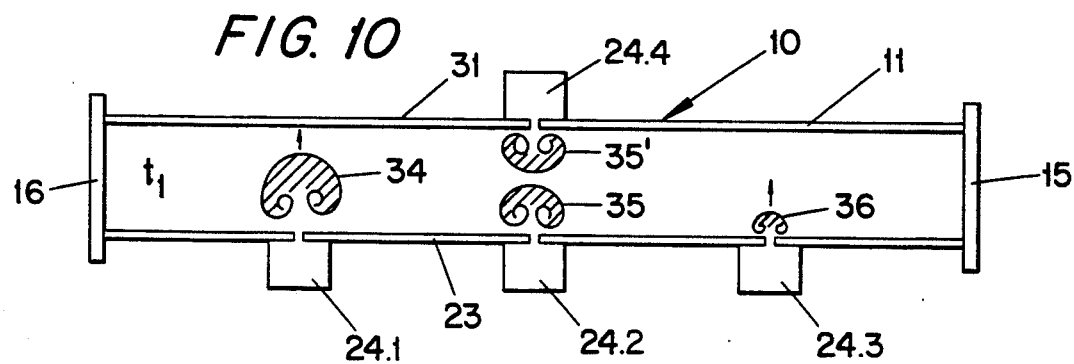
FIGS. 10 to 12 show the progress over time of the ignition process by means of a specific arrangement of hot gas pockets in accordance with one of the exemplary embodiments illustrated in FIGS. 5 to 7.
Figure 11:
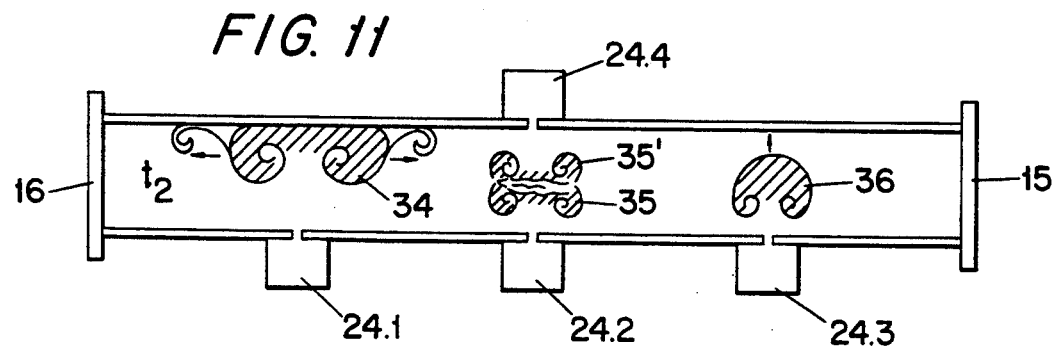
Figure 12:
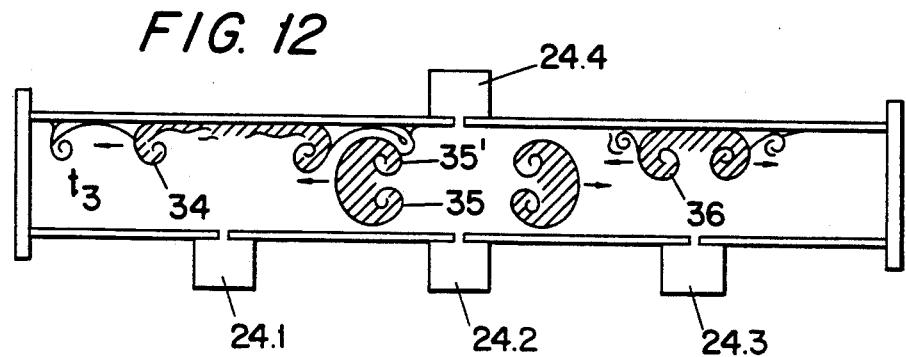

The ignition process will be described in greater detail by means of FIGS. 10 to 12. The hot gas pockets shown in FIGS. 10 to 12 can be embodied according to any of the embodiments shown in FIGS. 5 to 7. The cell 11 illustrated in FIGS. 10 to 12 has an inner wall 23 and an outer wall 31, embodied as two concentric cylinder-shaped walls. Three hot gas pockets 24.1, 24.2 and 24.3 are fastened to each inner wall 23 of the cells 11 of the cellular wheel 10, while one hot gas pocket 24.4 is fastened to the outer wall 31 opposite the centrally located hot gas pocket 24.2. The progression of the ignition operation is shown at three different times $t_1$ in FIG. 10, $t_2$ in FIG. 11, and $t_3$ in FIG. 12, $t_1$ being less than $t_2$ which is less than $t_3$. Spreading of the hot gases at these three different times $t_1$, $t_2$ and $t_3$ after the ignition process is intended to be shown by the lines 34, 35 and 36. The lines 34 correspond to ignition initiated by hot gas pocket 24.1. The lines 35 correspond to hot gas pocket 24.2 and lines 35' correspond to hot gas pocket 24.4. The lines 36 correspond to the ignition initiated by hot gas pocket 24.3. It is intended in particular to show that the ignition process, shown by 35 and 35', can be influenced by means of two oppositely located hot gas pockets, 24.2 and 24.4.

The foregoing has described the preferred principles, embodiments and modes of operation of the present invention; however, the invention should not be construed as limited to the particular embodiments discussed. Instead, the above-described embodiments should be regarded as illustrative rather than restrictive, and it should be appreciated that variations, changes and equivalents may be made by others without departing from the scope of the present invention as defined by the following claims.

What is claimed is:

1. A dynamic pressure machine with integrated combustion, comprising:
    a cellular wheel rotatably mounted between lateral sections on the air side and the gas side, the wheel provided with inlet and outlet openings;
    a plurality of cells arranged on the wheel for a continuously recurring ignition and combustion process; and,
    at least one hot gas pocket disposed on a wall of the cell, connected via an opening with the interior of the cell for the automatic ignition of an entering fresh gas mixture.

2. A dynamic pressure machine in accordance with claim 1, wherein a plurality of hot gas pockets are disposed on the cell wall in the direction of flow.

3. A dynamic pressure machine in accordance with claim 1, wherein the hot gas pockets are insulated.

4. A dynamic pressure machine in accordance with claim 1, wherein the hot gas pocket has an additional inner rib-shaped surface.

* * * * *